United States Patent
Ainscow et al.

(10) Patent No.: US 10,956,084 B2
(45) Date of Patent: Mar. 23, 2021

(54) DRIVE UTILIZATION IN MULTI-TIERED SYSTEMS WITH READ-INTENSIVE FLASH

(71) Applicant: INTERNATIONAL BUSINESS MACHINES CORPORATION, Armonk, NY (US)

(72) Inventors: Alexander H. Ainscow, Winchester (GB); Duo Chen, Shanghai (CN); John M. Clifton, Hertford (GB); Kushal Patel, Pune (IN); Sarvesh Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/970,906

(22) Filed: May 4, 2018

(65) Prior Publication Data

US 2019/0339903 A1    Nov. 7, 2019

(51) Int. Cl.
*G06F 3/06* (2006.01)

(52) U.S. Cl.
CPC ............ *G06F 3/0659* (2013.01); *G06F 3/067* (2013.01); *G06F 3/0611* (2013.01)

(58) Field of Classification Search
CPC .................................................... G06F 3/0659
USPC ........................................................ 711/117
See application file for complete search history.

(56) References Cited

U.S. PATENT DOCUMENTS

| | | | |
|---|---|---|---|
| 5,983,318 A * | 11/1999 | Willson | ................ G06F 12/122 369/30.31 |
| 6,237,021 B1 | 5/2001 | Drummond | |
| 8,843,459 B1 | 9/2014 | Aston et al. | |
| 8,868,797 B1 | 10/2014 | Kirac et al. | |
| 8,935,493 B1 | 1/2015 | Dolan et al. | |
| 8,972,694 B1 | 3/2015 | Dolan et al. | |
| 9,026,765 B1 | 5/2015 | Marshak et al. | |
| 9,047,017 B1 | 6/2015 | Dolan et al. | |
| 9,244,858 B1 | 1/2016 | Hu | |
| 2004/0064723 A1* | 4/2004 | Barnes | ................ G06F 12/1491 726/1 |
| 2008/0126603 A1* | 5/2008 | Hosoya | ................ G06F 3/0619 710/22 |
| 2017/0147237 A1 | 5/2017 | Fang et al. | |

(Continued)

OTHER PUBLICATIONS

Mark et al., "Cognitive Assistant that Learns and Organizes," AI Center: Projects, http://www.ai.sri.com/project/CALO, Copyright 2017 SRI International, Printed on Jul. 13, 2017, pp. 1-4.

(Continued)

*Primary Examiner* — Jae U Yu
(74) *Attorney, Agent, or Firm* — Robert D. Bean (57) ABSTRACT

According to one embodiment, a method, computer system, and computer program product for adjusting tiering based on operation types in a multi-tier storage system is provided. The present invention may include retrieving an extent to be managed and operations associated with the extent; analyzing the operations of the extent to determine an IO pattern associated with the extent; receiving a list of storage devices within the multi-tier storage system; querying each storage device of the storage devices for suitable pattern types; selecting, based on the querying and the IO pattern associated with the extent, a suitable storage device; and transferring the extent to the suitable storage device.

14 Claims, 7 Drawing Sheets

(56) References Cited

U.S. PATENT DOCUMENTS

2018/0232173 A1* 8/2018 Chung .................. G06F 3/0604

OTHER PUBLICATIONS

Hayashi et al., "Evaluation of SSD Tier Method and SSD Cache Method in Tiered Storage System," Electronics and communications in Japan, Research Article, vol. 98, Issue 7, Jul. 2015, First Published Jun. 11, 2015, pp. 1-7.
Hewlett Packard Enterprise, "Accelerate applications dynamically," Solution brief, Nov. 2015, Rev. 2, copyright 2014-2015 Hewlett Packard Enterprise Development LP, pp. 1-2.
Mell et al., "The NIST Definition of Cloud Computing," National Institute of Standards and Technology, U.S. Department of Commerce, Special Publication 800-145, Sep. 2011, pp. 1-7.

* cited by examiner

DRIVE UTILIZATION IN MULTI-TIERED SYSTEMS WITH READ-INTENSIVE FLASH

BACKGROUND

The present invention relates, generally, to the field of computing, and more particularly to tiered data storage.

Data storage is the field concerned with efficiently and safely storing and maintaining digital data. Tiered data storage is an increasingly common methodology of data storage where data is stored on various types of storage devices primarily based on criteria of the access, frequency of the use, security and data recovery requirements. For example, data that is frequently accessed by an application that is response time sensitive might be stored on solid state drives. Other data that is infrequently accessed and for which a higher response time is more tolerable might be stored on high capacity 7.2K RPM drives. The cost per gigabyte of storage is much higher for solid state drives (SSDs) than it is for the 7.2K RPM drives. In any multi-tiered storage system, there should be at least two tiers available, where one tier provides fast response time and the other provides relatively slow response times. Since storage with faster response times is usually more expensive than storage with slower response times, faster storage is typically manufactured at a comparatively lower capacity than that of slower storage. Based on the data access frequency, multi-tier algorithms relocate hot data to the upper tier and cold data to the lower tier. Optimizing data access while minimizing wearing of the drives and hewing to use, security and data recovery requirements is a goal of any multi-tiered storage system, and, by extension, the field of tiered data storage.

SUMMARY

According to one embodiment, a method, computer system, and computer program product for adjusting tiering based on operation types in a multi-tier storage system is provided. The present invention may include retrieving an extent to be managed and operations associated with the extent; analyzing the operations of the extent to determine an input/output (IO) pattern associated with the extent; receiving a list of storage devices within the multi-tier storage system; querying each storage device of the storage devices for suitable pattern types; selecting, based on the querying and the IO pattern associated with the extent, a suitable storage device; and transferring the extent to the suitable storage device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to tiered data storage. The following described exemplary embodiments provide a system, method, and program product for, among other things, performing tiering adjustments in a multi-tiered system that take into account the hotness type in the extent and data placement across storage tiers. Therefore, the present embodiment has the capacity to improve the technical field of tiered data storage by saving wear on the read intensive drives that occurs as a result of incorrect placement by the tiering algorithm, eliminating the heavy write latency of read-intensive drives by avoiding placing write-heavy extents on read-heavy drives, and improving the performance of the system as extents are correctly placed based on their input/output (IO) types and thereby reap the benefits of the multi-tiered storage paradigm, while simultaneously being easy to integrate with existing storage controllers and requiring no additional space within the storage system.

As previously described, data storage is the field concerned with efficiently and safely storing and maintaining the increasing amount of digital data in society. Tiered data storage is an increasingly common methodology of data storage where data is stored on various types of storage devices primarily based on criteria of the access, frequency of the use, security and data recovery requirements. For example, data that is frequently accessed by an application that is response time sensitive might be stored on solid state drives. Other data that is infrequently accessed and for which a higher response time is more tolerable might be stored on high capacity 7.2K RPM drives. The cost per gigabyte of storage is much higher for SSDs than it is for the 7.2K RPM drives. In any multi-tiered storage system, there should be at least two tiers available, where one tier provides fast response time and the other with relatively slow response times. Since storage with faster response times is usually more expensive than storage with slower response times, the capacity of faster storage is smaller than that of slower storage. Based on the data access frequency, multi-tier algorithms relocate hot data to the upper tier and cold data to the lower tier. Optimizing data access while minimizing wearing of the drives and hewing to use, security and data recovery requirements is the goal of any multi-tiered storage system, and, by extension, the field of tiered data storage.

Endurance, or the amount of write cycles a flash-based SSD can perform to a block of flash memory before becoming unreliable, is a significant factor that multi-tier systems often take into account. Traditionally, enterprise class solid state drives (SSD's) are built on mid- to high-endurance multi-level cell flash. Because of software advances and industry demands, read intensive SSDs can be used with applications where the write operations are less frequent. Read intensive SSDs are less expensive to use, but also have lower endurance and performance. The NAND flash used in read intensive drives tends to be of lower endurance than the NAND flash used in SSDs that are targeted for write intensive or mixed workloads (mainstream endurance). Therefore, the number of write operations to a read intensive drive is limited (typically to one drive write per day (DWPD) versus 10 DWPD on a mainstream endurance drive). A drive write per day writes the capacity of the drive in 24 hours. For example, a DWPD for a 387 GB drive writes 387 GB of data on the drive in 24 hours. One could write more data in a day, but the DWPD is the average usage rate by which the life span of the drive is calculated. The cost per GB of a read intensive drive is typically less than the cost per GB of a mainstream endurance drive. The cost is low because the amount of over-provisioning is less and almost all the flash memory in the drive is available for storing data. Read intensive drives are similar to mainstream endurance drives in terms of read performance. However, because of the lower over-provisioning of the read-intensive drives, the write performance is reduced because of the higher number of background operations that are needed for garbage collection and associated write amplification. Thus, lower over-provisioning decreases both performance and endurance.

A read intensive drive is not suitable for write intensive workloads. Assuming a typical heavily random workload, at about 3394 TB of write operations to the drive, the read intensive drive is at its maximum projected write capability. If the write operations exceed the drive's maximum write capacity, the write operation takes more time to complete. A failure analysis message indicates that one should replace the drive. If one ignores the message and continues to send the write operation requests to the drive, the drive may be unable to accept write commands and may accept only read commands for some time. A failed write operation results in a more serious error message that indicates that the drive must be replaced.

The process of migration across the tiers involves movement of data between the available tiers, and performing write operations to the target tier disk. This extent movement is typically initiated by considering the hotness of the extent, and the target disk is selected based on the hotness. In the storage systems, the extents are allocated from the tier 2 disk drives as the home location and are moved to the other tiers based on the hotness of the extent by the tiering instrument. The tiers are allocated in such a way that read-intensive flash is placed in tier 2 and if the data becomes hot, then it is moved to other tier 0 flash drives. Same techniques apply for extent demotion from read intensive drives to slower-performing systems. However, in this situation, a problem may arise; if the data is placed in tier 3 and experiences large IO, the tiering mechanism moves the data to the upper tier, which consists of read-intensive drives. In this movement, the IO load type is not considered, and if the data at a slower tier becomes hot due to extensive write operations (for example, redo logs of a database), then placing this extent on the upper tier increases the latency of the future write operations; furthermore, this placement leads to more write operations on the read intensive drive, which could result in the drive exceeding its maximum write capacity, which may result in early wear on the drive, and ultimately premature failure of the read-intensive drives. The field of data storage has struggled with solving this issue; the most common approach is to pin write-intensive data in to non-read-intensive drives, which is not feasible as the extent cannot trigger the advantages of the tiering system if data is pinned to a particular tier. Additionally, pinning the data to a tier may contribute additional overhead to the storage controller, and thereby negatively impact the performance of the system. As such, it may be advantageous to, among other things, implement a system that considers the IO workload type of the drives within the system as well as the data itself while performing the tiering decisions in a multi-tier system.

According to one embodiment, the invention is a method of storage tiering that monitors the IO pattern per extent, and maps the IO patterns that each individual drive within the system is particularly suited to handling; the system may further distinguish read and write IO from the live IO operations, and at the time of tiering decisions by a data placement analyzer, select the target tier based on the target capabilities with regard to the read and write IOs and the type of IO happening to the extent. For example, if the extent has become hot due to the write IOs, then the proposed method places the extent on tier 0 flash instead of tier 1 flash to reduce the future write operations on read-intensive drives. This mechanism is used for extent demotion where the extent is moved from a tier 0 flash drive to create space or in response to observed coldness of the extent. The IO pattern and types are monitored and the extent is placed accordingly in the correct tier in order to elicit better application performance. In a further embodiment, the system is capable of predicting future IO patterns and placement of extents by tiering manager and reacting accordingly, for example moving an extent to a read-intensive drive when the system predicts that a scheduled backup is imminent, which helps to free up space in tier 0 flash. The system may further be capable of connecting and using cognitive APIs to carve out history-based and pattern-based insights for drives, and articulating insights in response to user requests.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for performing tiering adjustments in a multi-tiered system that take into account the hotness type in the extent and data placement across storage tiers.

Figure 1:
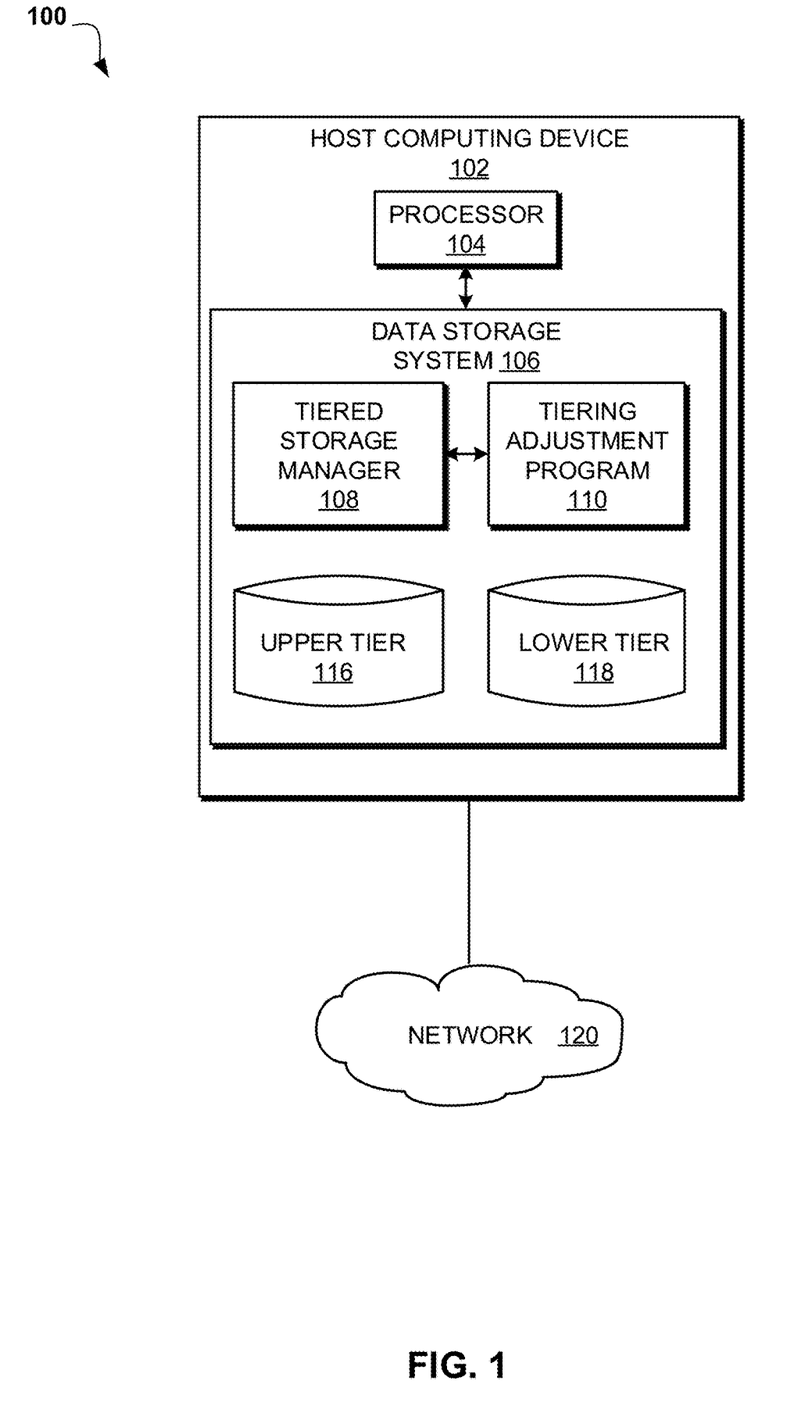
FIG. 1 illustrates an exemplary networked computer environment according to at least one embodiment.

Referring to FIG. 1, an exemplary networked computer environment 100 is depicted, according to at least one embodiment. The networked computer environment 100 may include host computing device 102 connected to a communication network 120. According to at least one implementation, the networked computer environment 100 may include a plurality of host computing devices 102, multiple SSD stores 116, and/or multiple HDD stores 118, of which only one of each is shown for illustrative brevity.

The communication network 120 may include various types of communication networks, such as a wide area network (WAN), local area network (LAN), a telecommunication network, a wireless network, a public switched network and/or a satellite network. The communication network 120 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Host computing device 102 may include a processor 104 and a data storage system 106 that is enabled to host and run a tiered storage manager 108 and a tiering adjustment program 110 and communicate with other host computing devices 102 or other data repositories such as data storage systems 106 via the communication network 120, in accordance with one embodiment of the invention. Host computing device 102 may be, for example, a mobile device, a telephone, a personal digital assistant, a netbook, a laptop computer, a tablet computer, a desktop computer, a server, or any type of programmable computing device capable of running a program and accessing a network. As will be discussed with reference to FIG. 5, the host computing device 102 may include internal components 502a and external components 504a, respectively. As will be discussed with reference to FIG. 5, the host computing device 102 may include internal components 502b and external components 504b, respectively. The host computing device 102 may also operate in a cloud computing service model, such as Software as a Service (SaaS), Platform as a Service (PaaS), or Infrastructure as a Service (IaaS). The host computing device 102 may also be located in a cloud computing deployment model, such as a private cloud, community cloud, public cloud, or hybrid cloud.

Data storage system 106 may be any system capable of reading and writing digital data to one or more storage devices. The storage devices of data storage system 106 may comprise at least two tiers, an upper tier 116, and a lower tier 118. Upper tier 116 may generally include the highest-performance storage devices available within the data storage system 106. The storage devices of upper tier 116 may be individually specialized in the type of operation that that drive handles most efficiently; for instance, some drives may be particularly suited to handling write operations, and others particularly suited to read operations. The lowest performing storage devices of data storage system 106 may comprise lower tier 118, although the storage devices of lower tier 118 may be of greater storage capacity than the drives of upper tier 116. The data storage system 106 may be managed by tiered storage manager 108, which may be a program capable of managing read-write operations to the storage devices of data storage system 106, may be capable of promoting and demoting data between upper tier 116 and lower tier 118, may store lists of drives and extents to be managed, and administrating the input/output (I/O) of data storage system 106.

According to the present embodiment, the tiering adjustment program 110 may be a program capable of performing tiering adjustments in a multi-tiered system that take into account the hotness type in the extent and data placement across storage tiers. The tiering adjustment method is explained in further detail below with respect to FIG. 2. The tiering adjustment program 110 may be a discrete program or it may be a subroutine or method integrated into tiered storage manager 108. The tiering adjustment program 110 may be located on the host computing device 102 or on any other device located within network 114. Furthermore, tiering adjustment program 110 may be distributed in its operation over multiple devices, such as host computing devices 102.

Figure 2:
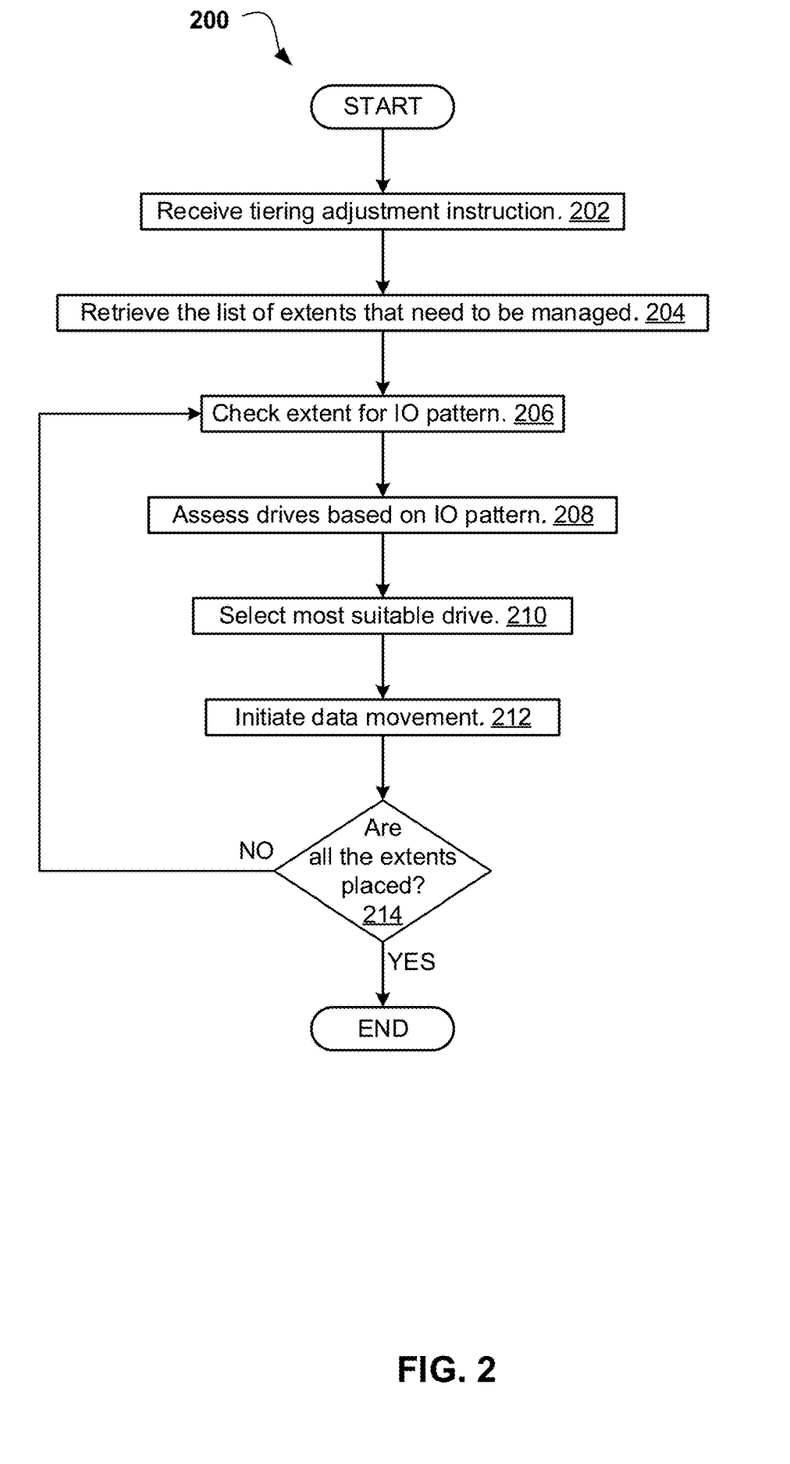
FIG. 2 is an operational flowchart illustrating a tiering adjustment process according to at least one embodiment.

Referring now to FIG. 2, an operational flowchart illustrating a tiering adjustment process 200 is depicted according to at least one embodiment. At 202, the tiering adjustment program 110 receives a tiering adjustment instruction. The tiering adjustment instruction may be an instruction to promote or demote one or more extents, and may be received from the tiered storage manager 108. The tiering adjustment instruction may be received in response to an event, or at regular intervals.

Next, at 204, tiering adjustment program 110 retrieves the list of extents that need to be managed. The list of extents may be retrieved from tiered storage manager 108. The list of extents to be managed may be a list of all extents within data storage system 106 that are 'hot,' or have been subjected recently to a high volume of operations. This list may also include all of the operations performed on each of the extents on the list, including read and write operations.

Then, at 206, tiering adjustment program 110 checks an extent from the list for its IO pattern. Here, tiering adjustment program 110 checks the IO operations associated with an extent from the list to determine which operations the extent has predominantly been subjected to. The IO pattern may simply indicate the type of operation that has been performed most on the extent within a predetermined period of time; for example, if the extent has been the subject of a high number of write operations and a lower number of read operations, the IO pattern may indicate write operations. In some embodiments, the IO pattern may indicate the relative amount of each type of operation performed on the extent. In some embodiments, tiering adjustment program 110 may check the IO pattern of the extent multiple times throughout the tiering adjustment process, in order to dynamically adapt to changes in the extent's IO pattern, and thereby ensure that if the IO pattern of an extent changes during the process, the extent will not be placed into an unsuitable storage device.

Next, at 208, tiering adjustment program 110 assesses drives based on the IO pattern. Here the tiering adjustment program 110 determines what IO pattern each storage device in the data storage system is most efficient at handling. For instance, the data storage system may contain a solid state drive, which is best suited for write operations. The tiering adjustment program 110 may identify what IO pattern each storage device in the data storage system 106 is most efficient at handling by a variety of different ways; for example, in some embodiments, tiering adjustment program 110 may query the drives of the data storage system 106 for information on suitable pattern types. The tiering adjustment program 110 may also have access to a list of storage devices and the IO patterns that they best support pre-supplied by a user or by tiered storage manager 108, and may query storage devices in the data storage system 106 to identify the storage device and check it against the list to identify the IO pattern. The tiering adjustment program 110 may also receive a list of the data storage system 106's storage devices from tiered storage manager 108. In some embodiments, tiering adjustment program 110 may identify each storage device's pattern type for itself, such as by analyzing drive performance over time when data is moved onto a particular type of storage; the analysis may be implemented by storing the IO pattern type along with the corresponding latency observed on each storage device for each given IO pattern for all of the storage devices in data storage system 106. In such an embodiment, the tiering adjustment program 110 may use past history of storage device performance to continually improve its assessment of each storage device's IO patterns over multiple tiering cycles.

Then, at 210, tiering adjustment program 110 selects the most suitable drive. The most suitable drive may be the storage device within the data storage system 106 which is best suited to handle the operations being performed on the extent; in other words, the most suitable drive may be the drive that best handles matching pattern types to the IO pattern associated with the extent. For instance, a read-intensive drive with endurance superior to other storage devices within data storage system 106 may be the most suitable drive where the extent is read-heavy. Other considerations may be taken into account in determining the most suitable drive, including the speed, endurance, capacity, workload, distance, age, reliability, and wear of any given storage device. The device upon which the extent is currently located may also be taken into account; for example, if the extent is write-intensive and is currently located on a read-intensive drive, the extent may be moved to a drive that is not particularly suited for write-intensive operations so long as it is less unsuitable than the read-intensive drive. The most suitable drive may also be referred to as a matching drive.

Next, at 212, tiering adjustment program 110 initiates the data movement. The tiering adjustment program 110 may perform the data movement itself, or send a request to tiered storage manager 106 to perform the data movement. Here the extent is moved to the most suitable drive.

Then, at 214, the tiering adjustment program 110 determines whether all the extents have been placed. The tiering adjustment program 110 determines whether all extents have been placed by checking the extents that have been placed against the list of extents to be managed. According to one implementation, if the tiering adjustment program 110 determines that not all extents have been placed (step 214, "NO" branch), the tiering adjustment program 110 may continue to step 206 to check an extent from the list for an IO pattern. If the tiering adjustment program 110A, 110B determines that all extents have been placed (step 214, "YES" branch), the tiering adjustment program 110 may terminate.

Figure 3A:
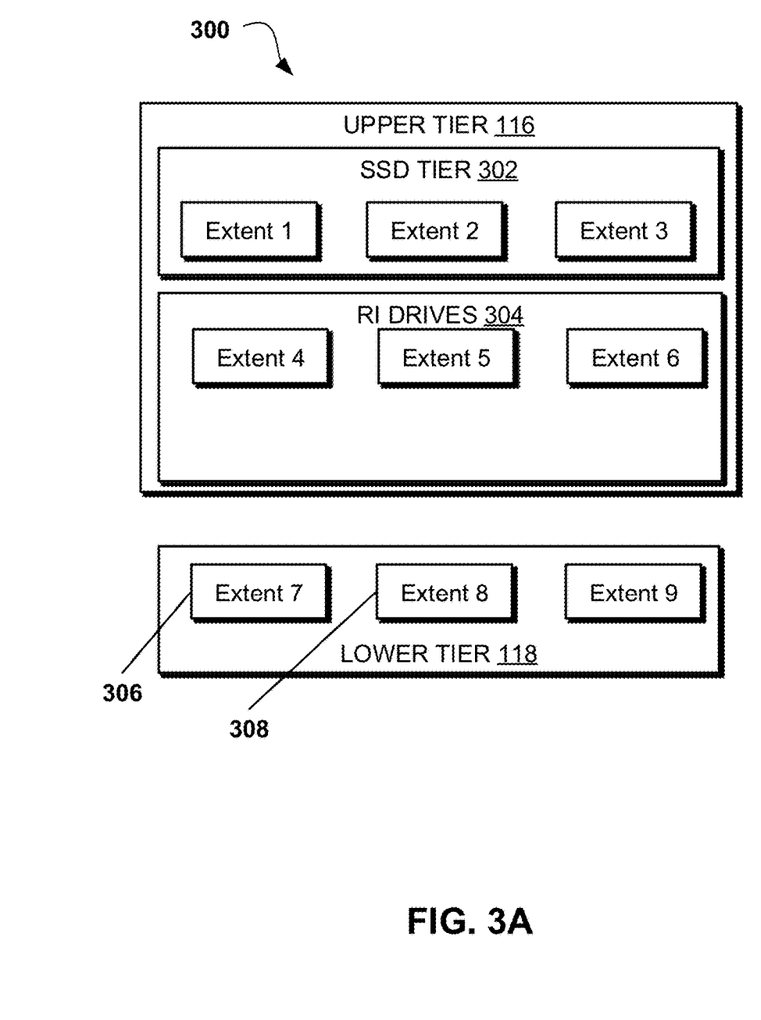
FIG. 3A is a block diagram illustrating an exemplary multi-tiered storage system prior to the execution of a generic tier adjustment method.

Referring now to FIG. 3A, a block diagram 300 of an exemplary multi-tiered storage system prior to the execution of a generic tiering adjustment method. The exemplary storage system here contains an upper tier 116, which further contains an SSD tier 302, which is comprised of solid-state storage devices particularly efficient at write operations. Upper tier 116 here also contains RI drives 304, which is comprised of read-intensive storage devices particularly efficient at read operations. The exemplary multi-tiered storage system 300 further includes a lower tier 118. Disposed within both upper tier 116 and lower tier 118 are extents 1-9, among which is an extent 306 which has recently "become hot" in that it has become subjected to heavy volume of write operations, and an extent 308 which has 'become hot' in that it has become subjected to a heavy volume of read operations. Write-heavy extent 306 and read-heavy extent 308 wait in lower tier 118 to be promoted to a higher tier by tiered storage manager 108 in accordance with a generic tiering method.

Figure 3B:
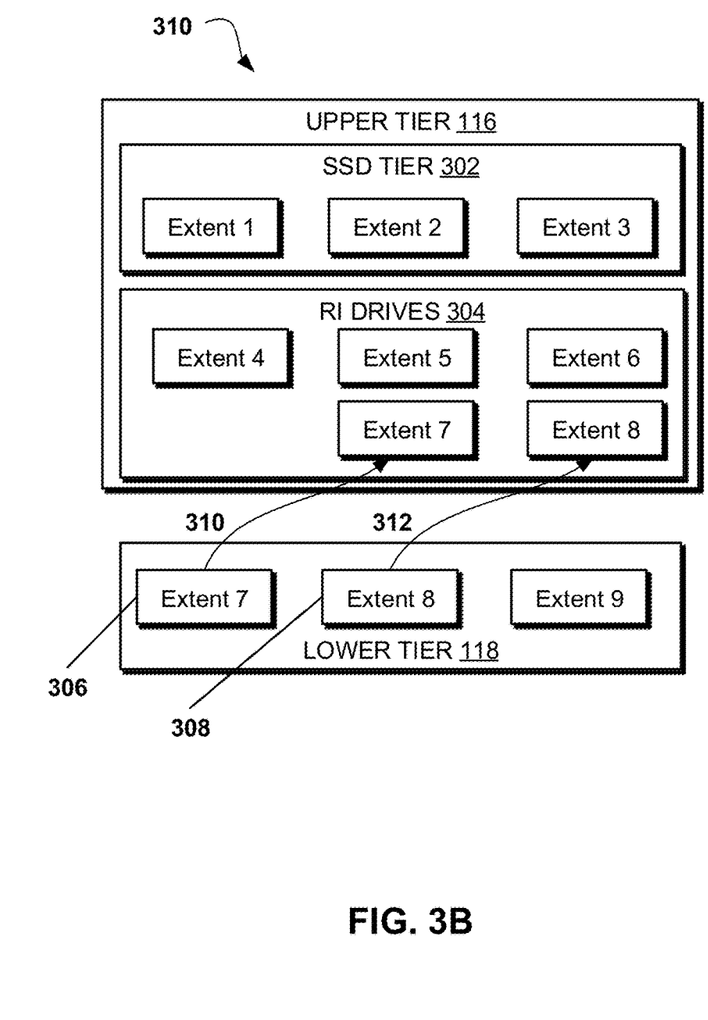
FIG. 3B is a block diagram illustrating an exemplary multi-tiered storage system prior to the execution of a generic tier adjustment method.

Referring now to FIG. 3B, a block diagram 310 which depicts the same exemplary multi-tiered storage system as FIG. 3A, but after the generic tiering adjustment method has been completed. Here, the generic tiering adjustment method perceives that both the write-heavy extent 306 and the read-heavy extent 308 are 'hot,' in that they are subjected to a large number of read and/or write operations, and therefore must be moved to upper tier 116 to improve efficiency, but the generic method does not take into account what particular operations has caused each extent to become 'hot'; accordingly, the tiered storage manager 108 has promoted 310 write-heavy extent 306 to RI drives 304, and has also promoted 312 read-heavy extent 308 to RI drives 304, since RI drives 304 is the adjacent tier within upper tier 116. However, since write-heavy extent 306 is write intensive and has been placed on read-intensive drives, the write performance becomes very poor; applications accessing write-heavy extent 306 will suffer heavy write latency issues which may result in unpredictable application behavior and crashes. Additionally, the write intensive extent wears the read-intensive drives and decreases the lifespan of the drive.

Figure 4A:
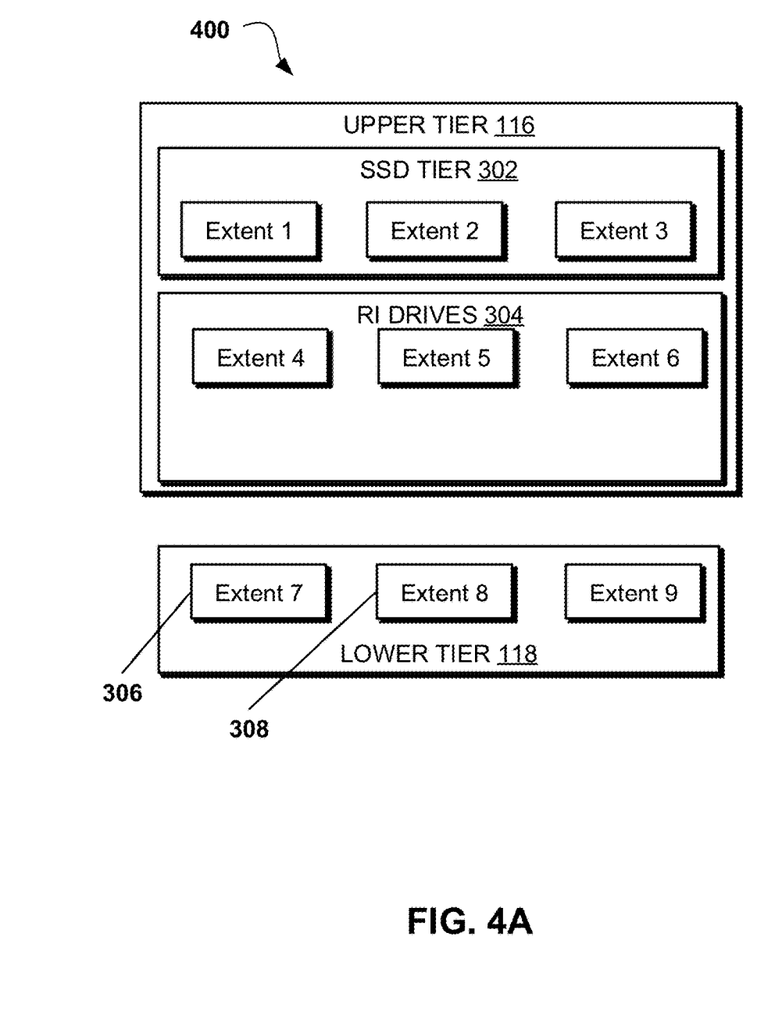
FIG. 4A is a block diagram illustrating an exemplary multi-tiered storage system prior to the execution of a tiering adjustment process according to at least one embodiment.

Referring now to FIG. 4A, a block diagram 400 of an exemplary multi-tiered storage system prior to the execution of a tiering adjustment process 200 is depicted according to at least one embodiment. FIG. 4A depicts the same exemplary multi-tiered storage system as FIG. 3A, but where write-heavy extent 306 and read-heavy extent 308 wait in lower tier 118 to be promoted to a higher tier by tiered storage manager 108 in accordance with tiering adjustment process 200.

Figure 4B:
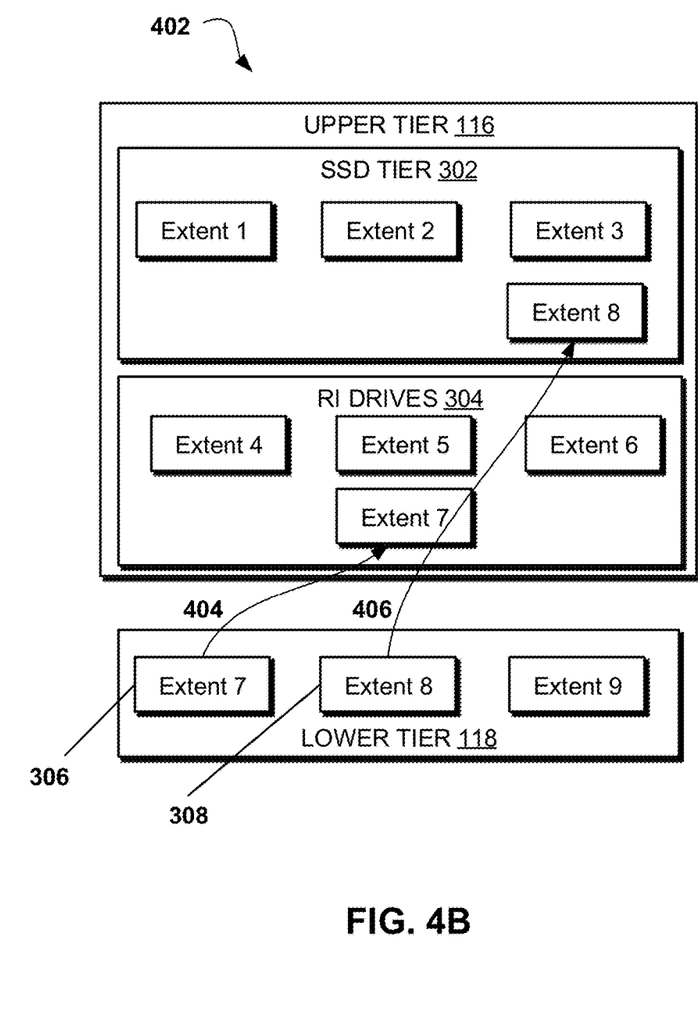
FIG. 4B is a block diagram illustrating an exemplary multi-tiered storage system subsequent to the execution of a tiering adjustment process according to at least one embodiment.

Referring now to FIG. 4B, a block diagram 402 which depicts the same exemplary multi-tiered storage system as FIG. 4A, but after the tiering adjustment process 200 has been completed. Here, the tiering adjustment process 200 perceives that both the write-heavy extent 306 and the read-heavy extent 308 are 'hot,' in that they are subjected to a large number of read and/or write operations, and therefore must be moved to upper tier 116 to improve efficiency; tiering adjustment process 200 further assesses the particular operations that have caused each extent to become 'hot'; accordingly, the tiered storage manager 108 has promoted 404 write-heavy extent 306 to SSD Tier 302, and has also promoted 406 read-heavy extent 308 to RI drives 304. Since SSD Tier 302 is best suited to write operations, and RI drives 304 is best suited to read operations, the placement of the two hot extents according to tiering adjustment process 200 provides superior utilization of the drives.

It may be appreciated that FIGS. 2-4B provide only an illustration of one implementation and do not imply any limitations with regard to how different embodiments may be implemented. Many modifications to the depicted environments may be made based on design and implementation requirements.

Figure 5:
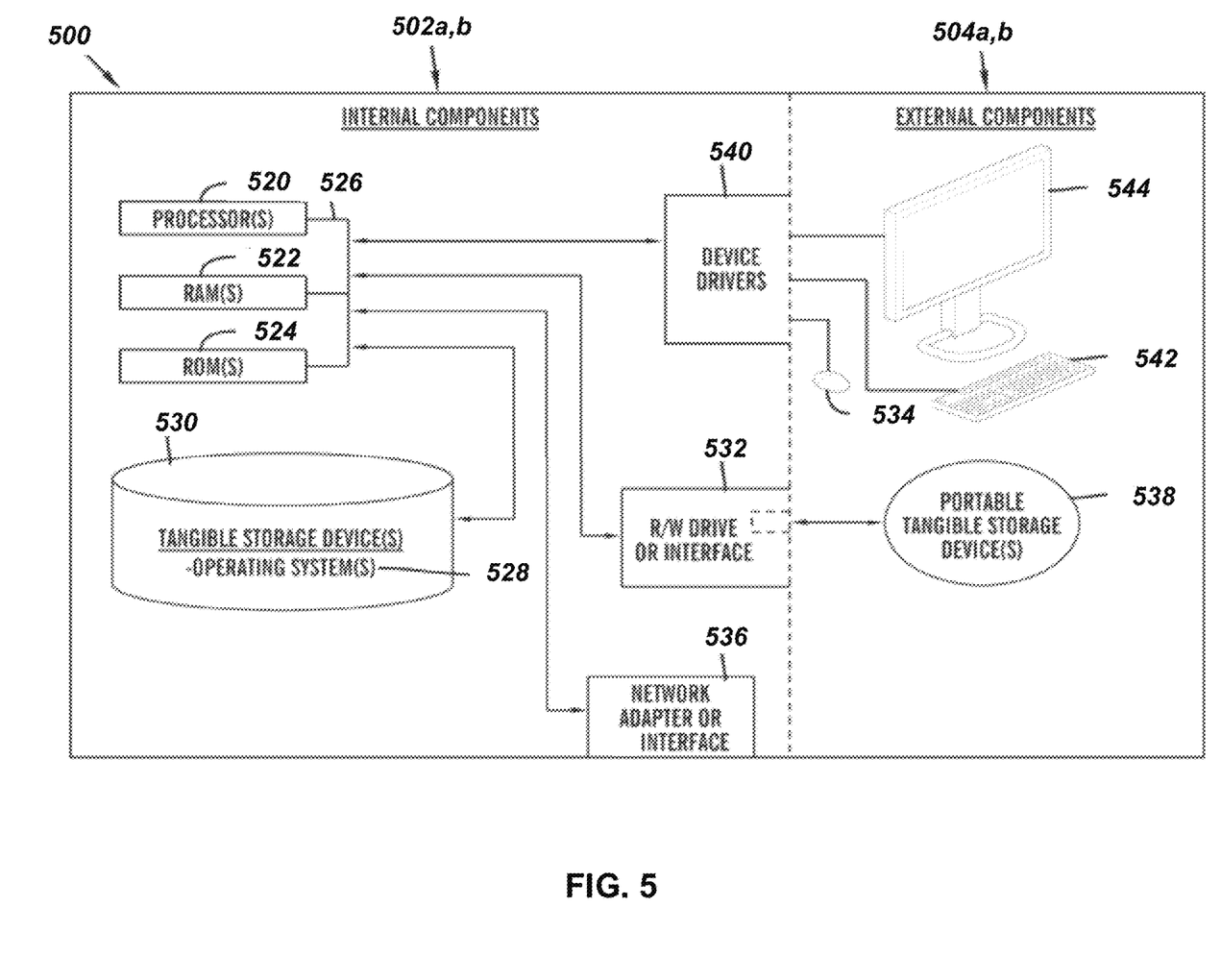
FIG. 5 is a block diagram of internal and external components of computers and servers depicted in FIG. 1 according to at least one embodiment.

FIG. 5 is a block diagram 500 of internal and external components of the host computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The host computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the tiered storage manager 108 and the tiering adjustment program 110A in the host computing device 102, and the tiering adjustment program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the tiering adjustment program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The tiered storage manager 108 and the tiering adjustment program 110A in the host computing device 102 and the tiering adjustment program 110B in the server 112 can be downloaded to the host computing device 102 and the server 112 from an external computer via a network (for example, the Internet, a local area network or other, wide area network) and respective network adapters or interfaces 536. From the network adapters or interfaces 536, the tiered storage manager 108 and the tiering adjustment program 110A in the host computing device 102 and the tiering adjustment program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
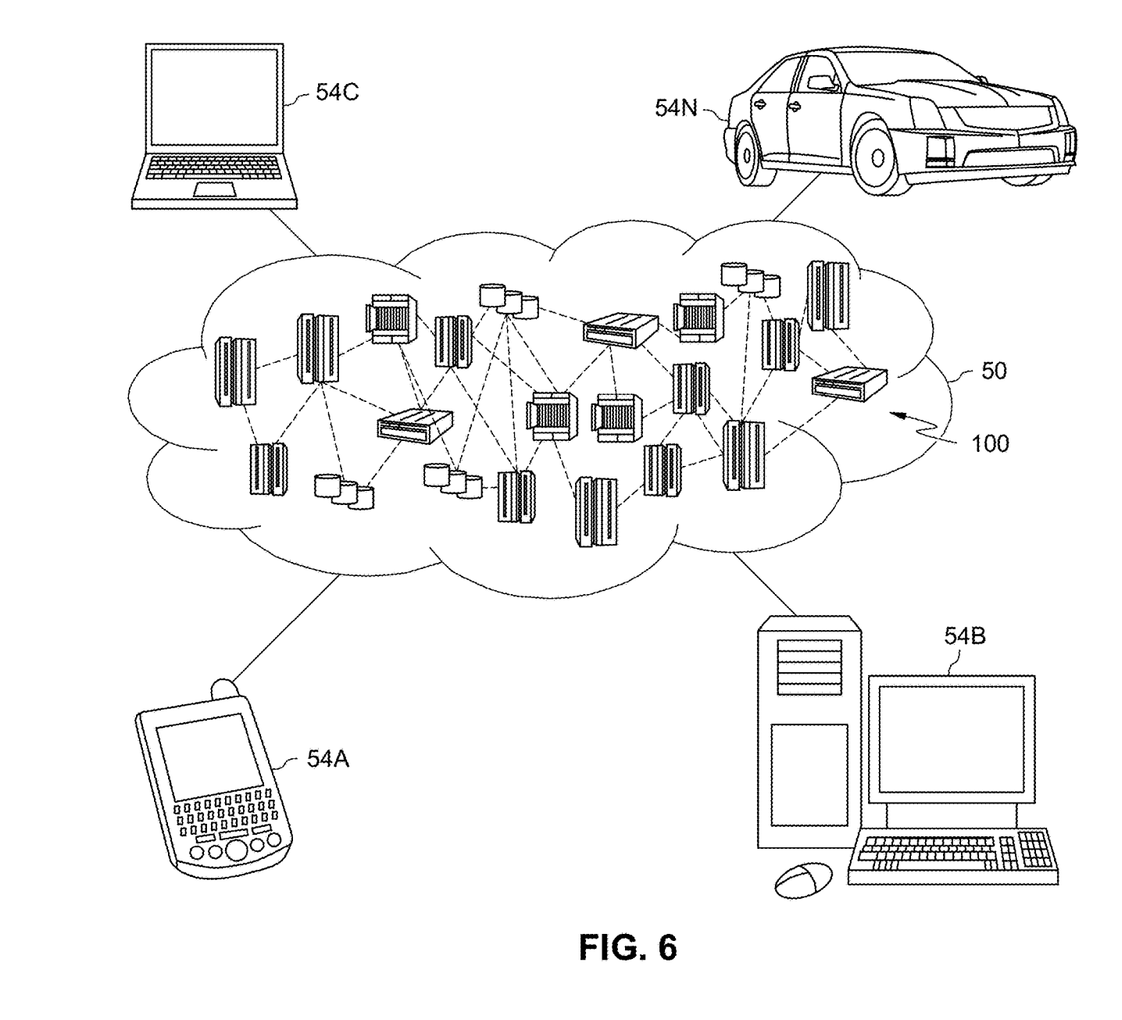
FIG. 6 depicts a cloud computing environment according to at least one embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
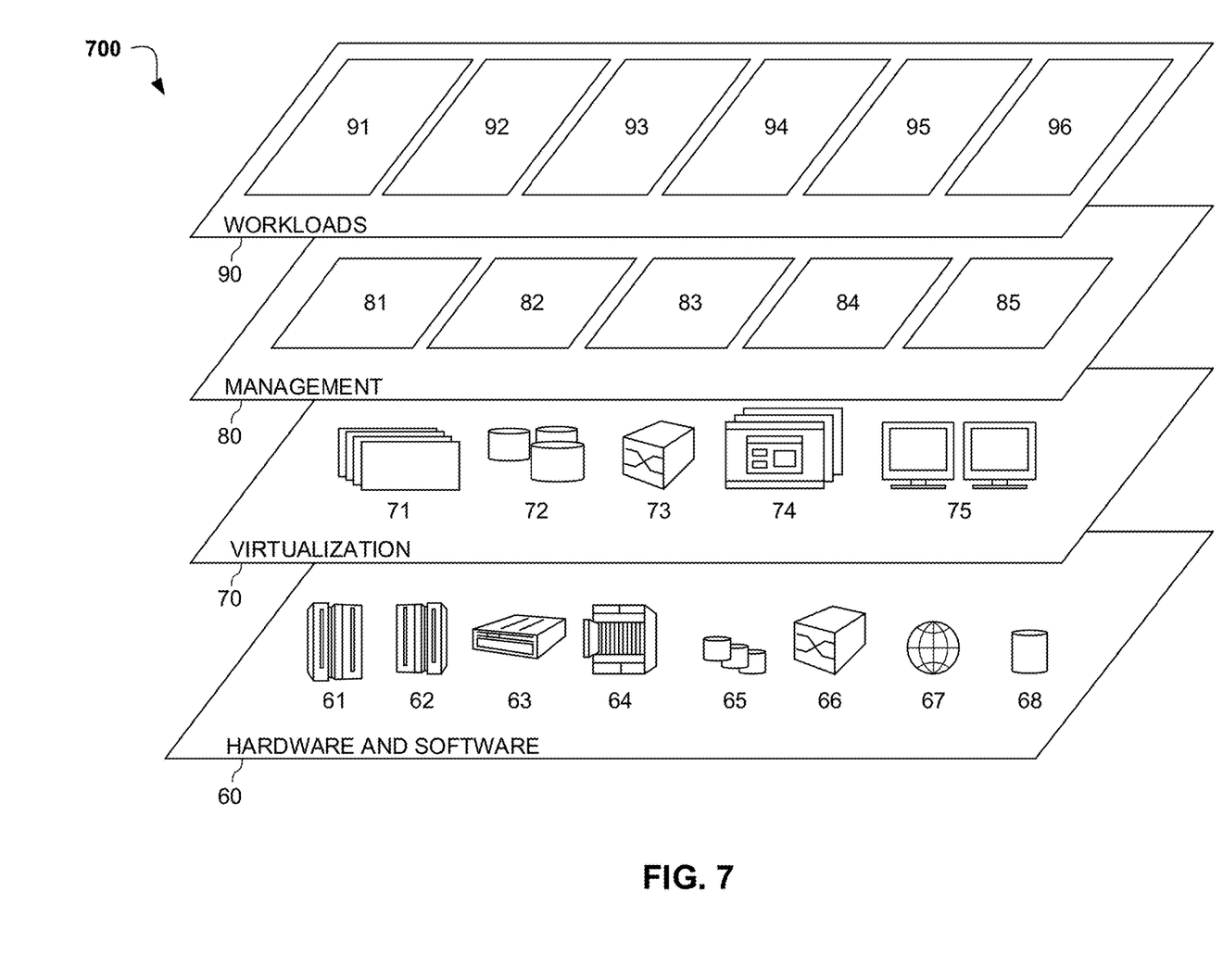
FIG. 7 depicts abstraction model layers according to at least one embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tiering adjustment 96. tiering adjustment 96 may relate to performing tiering adjustments in a multi-tiered system that take into account the hotness type in the extent and data placement across storage tiers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for adjusting tiering based on one or more operation types in a multi-tier storage system, the method comprising:

determining a performance of a plurality of storage devices in at least one tier of the multi-tier storage system with respect to read operations and write operations based on a past performance of the storage devices with respect to read operations and write operations;

selecting a storage device for storing an extent based on the performance of the one or more storage devices with respect to an operation most frequently performed on the extent, wherein the operation is a read operation or a write operation; and transferring the extent to the selected storage device.

2. The method of claim 1, further comprising:

predicting one or more future input/output patterns; and selecting a storage device for storing the extent based on the prediction.

3. The method of claim 1, further comprising:

checking that the operation most frequently performed on the extent has not changed from write operation to read operation or from read operation to write operation prior to transferring the extent to the storage device.

4. The method of claim 1, wherein the storage device is additionally selected based on the performance of a storage device upon which the extent is currently located.

5. The method of claim 1, wherein the suitable storage device is additionally selected based on one or more qualities selected from a list consisting of:
    speed, endurance, capacity, workload, distance, age, reliability, and wear.

6. A computer system for adjusting tiering based on one or more operation types in a multi-tier storage system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        determining a performance of a plurality of storage devices in at least one tier of the multi-tier storage system with respect to read operations and write operations based on a past performance of the storage devices with respect to read operations and write operations;
        selecting a storage device for storing an extent based on the performance of the one or more storage devices with respect to an operation most frequently performed on the extent, wherein the operation is a read operation or a write operation; and
        transferring the extent to the selected storage device.

7. The computer system of claim 6, further comprising:
    predicting one or more future input/output patterns; and
    selecting a storage device for storing the extent based on the prediction.

8. The computer system of claim 6, further comprising:
    checking that the operation most frequently performed on the extent has not changed from write operation to read operation or from read operation to write operation prior to transferring the extent to the storage device.

9. The computer system of claim 6, wherein the storage device is additionally selected based on the performance of a storage device upon which the extent is currently located.

10. The computer system of claim 6, wherein the suitable storage device is additionally selected based on one or more qualities selected from a list consisting of:
    speed, endurance, capacity, workload, distance, age, reliability, and wear.

11. A computer program product for adjusting tiering based on one or more operation types in a multi-tier storage system, the computer program product comprising:
    one or more computer-readable tangible storage medium and program instructions stored on at least one of the one or more tangible storage medium, the program instructions executable by a processor to cause the processor to perform a method comprising:
        determining a performance of a plurality of storage devices in at least one tier of the multi-tier storage system with respect to read operations and write operations based on a past performance of the storage devices with respect to read operations and write operations;
        selecting a storage device for storing an extent based on the performance of the one or more storage devices with respect to an operation most frequently performed on the extent, wherein the operation is a read operation or a write operation; and
        transferring the extent to the selected storage device.

12. The computer program product of claim 11, further comprising:
    predicting one or more future input/output patterns; and
    selecting a storage device for storing the extent based on the prediction.

13. The computer program product of claim 11, further comprising:
    checking that the operation most frequently performed on the extent has not changed from write operation to read operation or from read operation to write operation prior to transferring the extent to the storage device.

14. The computer program product of claim 11, wherein the storage device is additionally selected based on the performance of a storage device upon which the extent is currently located.

* * * * *